United States Patent [19]

Shoemaker

[11] Patent Number: 4,464,618
[45] Date of Patent: Aug. 7, 1984

[54] COMPOUND FIELD MOTOR

[76] Inventor: James F. Shoemaker, 6264 Kinsey Pl., St. Louis, Mo. 63109

[21] Appl. No.: 418,246

[22] Filed: Sep. 15, 1982

[51] Int. Cl.³ .............................................. H02P 1/44
[52] U.S. Cl. .................................. 318/794; 318/795; 318/817; 310/166
[58] Field of Search ............................... 318/793-797, 318/778, 817; 310/166

[56] References Cited

U.S. PATENT DOCUMENTS

| | | | |
|---|---|---|---|
| 3,031,606 | 4/1962 | Cantonwine | 318/794 |
| 4,095,149 | 6/1978 | Wanlass | 318/795 |
| 4,132,932 | 1/1979 | Wanlass | 318/795 |
| 4,221,983 | 9/1980 | Mourier | 318/794 |
| 4,313,076 | 1/1982 | Rathje | 318/790 |

*Primary Examiner*—J. V. Truhe
*Assistant Examiner*—A. Evans
*Attorney, Agent, or Firm*—F. Travers Burgess

[57] ABSTRACT

A single phase induction motor of the capacitor start, capacitor run type, has a rotor and stator of conventional polyphase design and a two phase stator winding comprising a main winding with approximately 70% as many turns as a comparable conventional single phase induction motor and an auxiliary winding in series with the main winding, the auxiliary winding having two branches wound in opposite directions, each branch having substantially the same number of turns as the main winding. One branch of the auxiliary winding is connected in series with a running capacitor and this combination is in turn connected in parallel with the other branch. The series arrangement of the main and auxiliary winding is connected to the supply line and a starting capacitor may be paralleled with the running capacitor during starting for improved starting torque in the conventional capacitor start manner. In one embodiment of the invention the main winding is a single winding and in an alternate embodiment it has two branches each connected in series with the respective branch of the auxiliary winding.

7 Claims, 7 Drawing Figures

COMPOUND FIELD MOTOR

BACKGROUND OF THE INVENTION

1. Field of the Invention

The invention relates to electric motors and more particularly to single phase induction motors of the capacitor start, capacitor run type.

2. The Prior Art

The principle of operation of polyphase induction motors is well established. The concepts of, (1) a uniform rotating magnetic field produced by polyphase voltages applied to multiple stator windings, (2) the production of torque from the interaction of induced rotor currents and the rotating field, and (3) the electrical terms and vector diagrams for motor analysis, are all well defined and understood. These motors are regarded as among the most useful and successful machines serving society. The majority of them are of the three phase type because this has developed as the standard of the industry, but two phase motors offer the same favorable operating characteristics.

Single phase induction motors are also well established for use where polyphase voltages are not utilized, and although commercially successful they are inferior to polyphase induction motors because they do not produce a uniform rotating field. Present day state of the art single phase induction motors encompass a variety of designs, all of which operate as imperfect two phase machines.

SUMMARY OF THE INVENTION

The compound field motor, presented here, is an improved design single phase induction motor which operates as a near perfect two phase machine with high power factor, the high power factor being a distinct and substantial improvement over both single phase and polyphase conventional designs. The rotor and stator of the compound field motor are conventional induction motor types and the invention is in the stator winding. As required by the two phase motor characteristics of this machine, the stator winding comprises a main winding and an auxiliary or cross field winding. The poles of the main winding are positioned symmetrically between the poles of the second winding as in the conventional polyphase manner. The preferred form for these windings is distributed, overlapping, as in conventional polyphase manner.

DETAILED DESCRIPTION OF THE INVENTION

Figure 1:
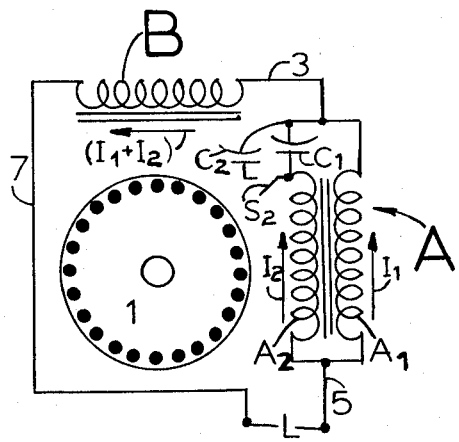
FIG. 1 is a schematic diagram of the stator winding of a motor embodying my invention.

Referring to FIG. 1, a motor has a rocket 1 and a stator in which the main winding B has approximately 70% of the number of turns that would be provided in the main winding of a conventional single phase induction motor of equivalent size. An auxiliary, or cross field, winding A is a double winding, with two branches $A_1$ and $A_2$, wound in opposite directions, each branch with substantially the same number of turns as main winding B. One branch $A_2$ of the double winding A is connected in series with an appropriate capacitor $C_1$ and this combination is connected in parallel with the other branch $A_1$ of double winding A, this parallel arrangement in turn being connected in series with main winding B by a suitable conductor 3, all as shown in FIG. 1. The auxiliary or cross field compound winding A is connected in series with main winding B and this combination is connected by conductors 5 and 7 to the power source L.

Figure 2:
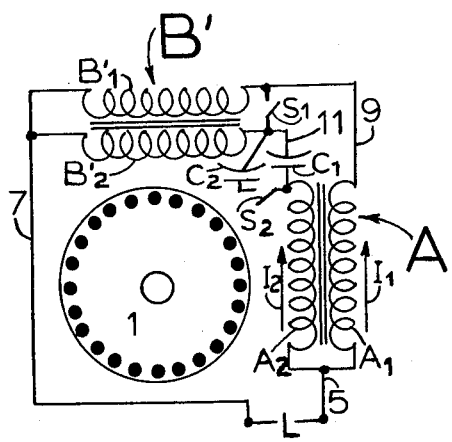
FIG. 2 is a schematic diagram of a modified form of my stator winding.

The alternate form of the invention illustrated in FIG. 2 is essentially the same as the form shown in FIG. 1 but with the main field B' wound in parallel with separate windings $B'_1$ and $B'_2$ connected respectively in series to auxiliary windings $A_1$ and $A_2$ by conductors 9 and 11, thus establishing two separate circuits completely through the motor. Optional switch $S_1$ provides means for connecting together conductors 9 and 11, producing the effect of a single main winding and allowing a choice or combination of single and parallel main winding operations through manual or automatic switching. The basic design and all alternate options have substantially similar operating characteristics.

Figure 3:
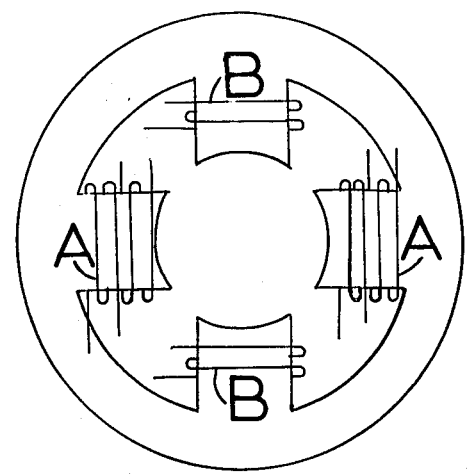
FIG. 3 is a schematic drawing of the embodiment of my invention in a two pole motor.

The application of the invention to the stator of a two pole motor is shown in FIG. 3, which illustrates how the poles of auxiliary winding A are positioned symmetrically between the poles of main winding B, as in a conventional polyphase motor.

Figure 5:
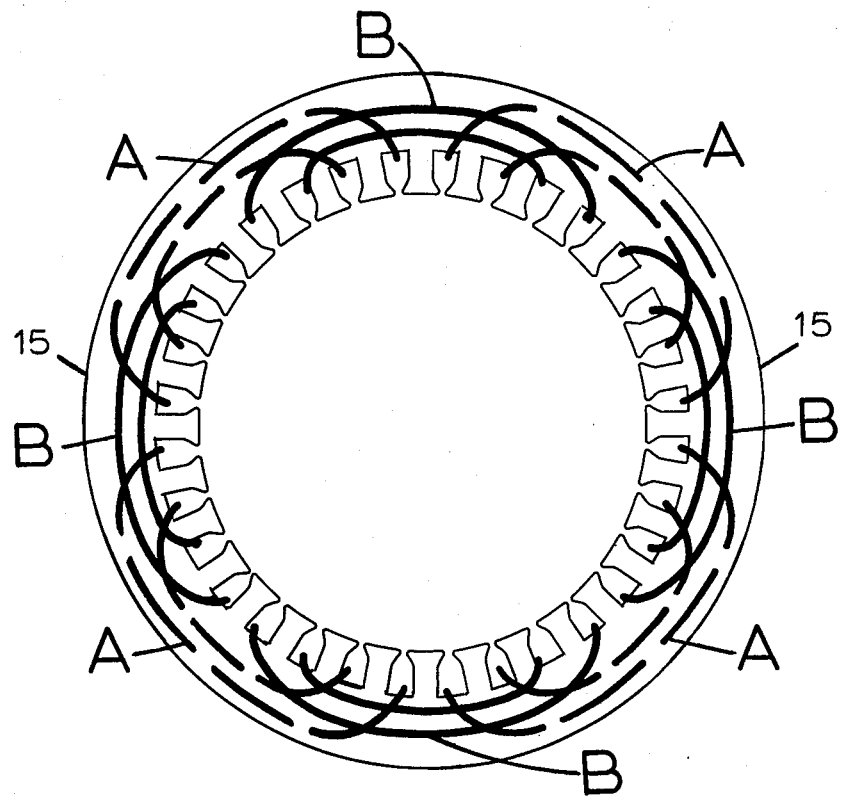
FIG. 5 is a sectional view of a stator core of a four pole motor wound in accordance with the preferred form of my invention.

In the preferred form of applying main and auxiliary windings B and A to a typical thirty-two slot stator 15 in a four pole arrangement, the windings A and B are distributed in overlapping relation circumferentially of the stator, as shown in FIG. 5.

As with conventional capacitor run motors, the starting torque of the compound field motor is inherently low. However, this may easily be raised to an adequate value by adding a starting capacitor $C_2$ in parallel with the running capacitor $C_1$ during starting using a centrifugally controlled switch $S_2$ as in conventional capacitor start motors.

Figure 4:
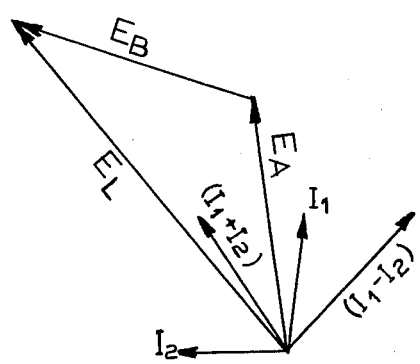
FIG. 4 is an assumed vector diagram for a compound field motor constructed according to my invention.

The manner in which my invention produces the rotating magnetic field required for an induction motor to run may be understood by reference to the vector diagram of FIG. 4, wherein vector $E_A$ represents the voltage on cross field winding A of FIG. 1, and $E_B$ represents the voltage on main winding B of FIG. 1. The vector sum of $E_A$ and $E_B$ equals the applied line voltage $E_L$.

As will be noted from FIG. 1, an arrow designated $I_1$ indicates the flow of current into the non-capacitor branch $A_1$ of the cross field winding A, and an arrow designated $I_2$ indicates the flow of current into the capacitor branch $A_2$ of the cross field winding A. Currents $I_1$ and $I_2$ combine to form the current $(I_1+I_2)$ amperes in main winding B. It is reasonable to assume from basic electrical theory that, with an appropriate capacitor $C_1$, the current $I_2$ will lead and current $I_1$ will lag the line voltage $E_L$. Test results and equations have shown this assumption to be true. Given this condition, referring to FIGS. 1 and 4 and in view of the fact that the two branches $A_1$ and $A_2$ of the cross field winding A are wound in opposite directions, it follows that with respect to the non-capacitor branch $A_1$ of cross field winding A the effective total current in the cross field winding A is $(I_1-I_2)$ amperes. Obviously the effective current in main winding B is $(I_1+I_2)$ amperes. These currents are shown as vectors in FIG. 4. This is all that is needed to satisfy the conditions for a rotating field, namely, currents out of phase in the respective windings which are angularly disposed about the rotational axis of the motor with respect to each other on the stator.

Figure 6:
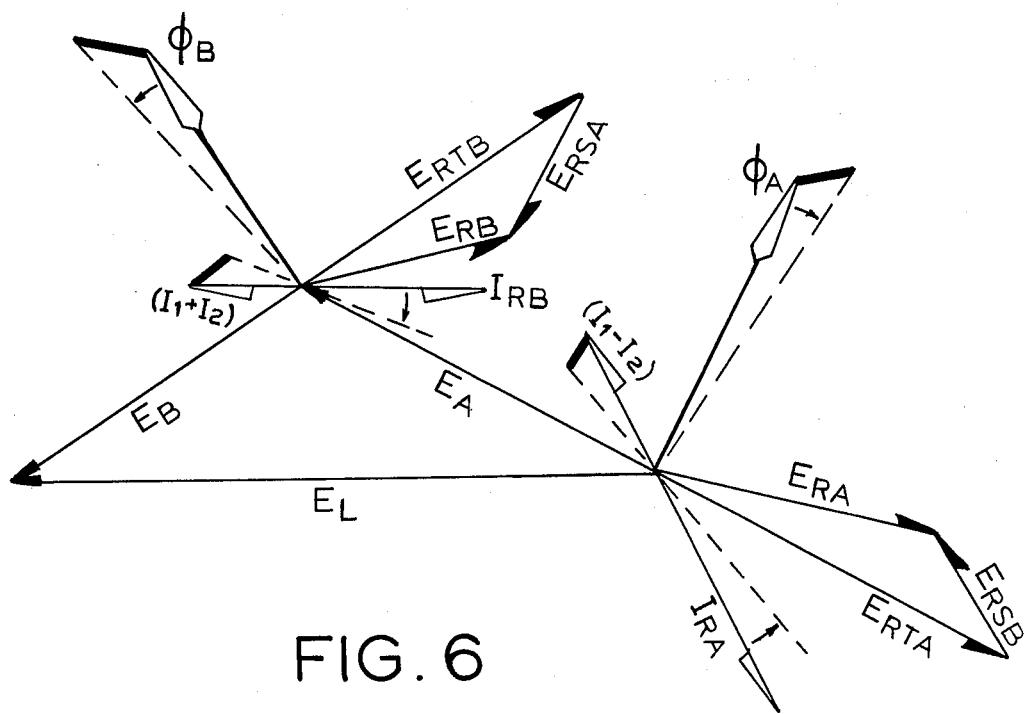

Ideal conditions for the compound field motor require the magnetic fluxes of the main and cross field windings to be equal in magnitude and 90 electrical degrees out of phase. This is the condition that produces the desired uniform rotating field. The tendency of my motor to seek this favorable condition is explained as follows:

The manner in which my motor regulates itself to achieve a high degree of uniformity throughout the rotating field is best understood by reference to the vector diagram of FIG. 6, which shows the same basic vectors $E_A$, $E_B$ and $E_L$ as shown in FIG. 4 and described earlier as representing the cross field winding voltage, the main winding voltage, and the line voltage respectively. The stator voltage drops of $E_A$ and $E_B$ and the magnetizing current will be ignored for clarity. Neither of these omissions affects the validity of the presentation.

The vectors emanating from the junction of voltage vectors $E_A$ and $E_L$ in FIG. 6 are defined as follows: The terms associated with the cross field winding A are $\phi_A$, the magnetic flux; $E_{RTA}$, the voltage induced in the rotor by transformer action of flux $\phi_A$; $E_{RSB}$, the voltage generated in the rotor on the A winding axis by speed action with the flux of winding B (and representing the interaction between main and cross field windings); and $E_{RA}$, the vector sum of $E_{RTA}$ and $E_{RSB}$. $I_{RA}$ represents the rotor current resulting from the rotor voltage $E_{RA}$ and the rotor impedance. The tendency of rotor current $I_{RA}$ to diminish and rotate counterclockwise due to the effect of voltage $E_{RSB}$ is also shown by a broken line. $(I_1-I_2)$ is the total effective line current in the cross field winding A and is the matching, mirror image of rotor current $I_{RA}$.

Corresponding letters with appropriate subscripts identify the vectors associated with main winding B, which emanate from the junction of vectors $E_B$ and $E_A$.

Some basic concepts underlying the following descriptive analysis of events are that (1) transformer voltages lag the fluxes producing them by 90 degrees and oppose the applied voltages, (2) speed action voltages are in phase with the fluxes producing them, and their magnitudes are proportional to motor speed, and (3) rotor currents are lagging due to the inductive impedance of rotors.

In FIG. 6 the angle between vectors $E_A$ and $E_B$ is greater than 90 degrees and the respective fluxes $\phi_A$ and $\phi_B$ are less than 90 degrees apart. Referring to the cross field vectors as just defined, the effect of rotor voltage $E_{RSB}$ in determining the resultant rotor voltage $E_{RA}$ should be noted. Both the magnitude and angle of $E_{RSB}$ are dependent on main winding flux $\phi_B$. As the rotor speed increases, the magnitude of $E_{RSB}$ increases and tends to swing resultant rotor voltage $E_{RA}$ in a counterclockwise direction. As a result of this action rotor current $I_{RA}$ also tends to decrease and rotate counterclockwise.

Referring to the upper part of FIG. 6 which shows the main field vectors emanating from the junction of voltages $E_A$ and $E_B$, the similar effect on the rotor voltage $E_{RB}$ by speed voltage $E_{RSA}$ should also be noted. A little study shows that $I_{RB}$ tends to decrease and rotate clockwise as $E_{RSA}$ increases. Thus we have established that $I_{RA}$ and $I_{RB}$ both tend to decrease and rotate in opposite directions due to the effect of the speed voltages in the rotor.

The line currents associated with rotor currents $I_{RA}$ and $I_{RB}$ are $(I_1-I_2)$ and $(I_1+I_2)$ respectively. According to the diagram, these line currents tend to rotate in a converging pattern with increasing motor speed. However, it can be shown that with realistic values of $I_1$ and $I_2$ these composite currents tend to diverge rather than converge with increasing speed. This unique opposition of theoretical principles is the basis of the favorable regulating characteristics of this motor and the cause is the series connection of the two fields which does not permit independent adjustments in each field according to basic laws as shown in the diagram.

In a descriptive sense, the result of this condition is that excess currents exist, somewhat as represented by the heavier lines at the tips of the $(I_1-I_2)$ and $(I_1+I_2)$ vectors. These increments of current are in excess of what is required to satisfy the circuit parameters. The result is that increments of flux are produced approximately 45 degrees lagging from these currents and these increments of flux add to the main and cross field fluxes $\phi_B$ and $\phi_A$ as shown. It should be noted that the direction of movement of the fluxes is to increase the angle between them—toward the 90 degrees desired.

The increments of extra current produce not only the extra fluxes but portions of load current as well.

Using this method it can readily be shown that if the angle between vectors $E_A$ and $E_B$ was less than 90 degrees and the corresponding angle between fluxes $\phi_A$ and $\phi_B$ was more than 90 degrees, the tendency would have been for the angle between the fluxes to decrease—toward the desired 90 degree value. It will be evident from this analysis how the magnitudes of the fluxes tend to equalize.

The degree of perfection of this regulation cannot be anticipated but must be determined from test results, or more properly by equations. These equations have been developed and show a phenomenal tendency toward the desired optimum results. Using realistic circuit values for a typical ¼ H.P. motor, the calculated flux magnitudes varied less than 1%, and the range of the angle between the fluxes was 90±2 degrees, for values of slip from no load to over 200% load. Similar results seem realistic for all practical motor sizes.

An interesting aspect of the developed impedance equations is that they reveal a dependence on relationships between the currents $(I_1-I_2)$ and $(I_1+I_2)$, which seems to substantiate the position previously stated herein that the motor regulation is dependent on a relationship of these currents.

Figure 7:
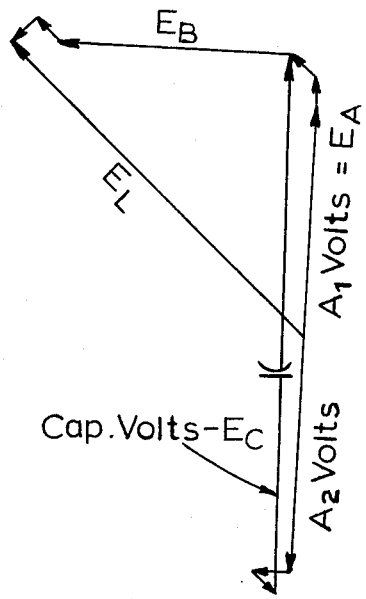
FIGS. 6 and 7 are additional vector diagrams explanatory of the operation of motors embodying the invention.

The compound field motor vector diagram of FIG. 7 demonstrates the relationship of voltages on the two branches of the cross field winding and the application of the capacitor and its voltage in the circuit.

In summary, the series arrangement of the two fields of my motor and the unique relationship of currents $I_1$ and $I_2$ in these field windings, allow the two field voltages to "float" and they adjust naturally from interaction of the fields to highly satisfactory values for two phase motor operation.

The details of the motor arrangements described herein may be varied substantially without departing from the spirit of the invention and the exclusive use of such modifications as come within the scope of the appended claims is contemplated.

I claim:

1. A single phase induction motor having a two phase stator winding comprising a main winding and an auxiliary cross field winding in series with each other throughout both the starting and running modes, said auxiliary winding having two branches wound in opposite directions, each of which has substantially the same number of turns as the main winding, one branch of said auxiliary winding being connected in series with a running capacitor, said one branch and said capacitor being connected in parallel with the other branch of said auxiliary winding.

2. A single phase induction motor according to claim 1, including a starting capacitor in parallel with said running capacitor and a speed responsive switch for cutting said starting capacitor out when a predetermined speed is exceeded.

3. A single phase induction motor according to claim 1, wherein said main winding has two branches in parallel with each other.

4. A single phase induction motor according to claim 3, wherein the branches of said main winding are in series with the respective branches of said auxiliary winding.

5. A single phase induction motor according to claim 4 including separate conductors connecting the respective main and auxiliary branches and a switch connecting said conductors and optionally operable between open and closed positions.

6. A single phase induction motor according to claim 1, having two poles wherein the poles of said auxiliary winding are positioned on the stator symmetrically between the poles of said main winding.

7. A single phase induction motor according to claim 1, having four poles wherein said main and auxiliary windings are distributed in overlapping relation circumferentially of the stator.

* * * * *

UNITED STATES PATENT AND TRADEMARK OFFICE
CERTIFICATE OF CORRECTION

PATENT NO. : 4,464,618
DATED : August 7, 1984
INVENTOR(S) : James F. Shoemaker

It is certified that error appears in the above-identified patent and that said Letters Patent are hereby corrected as shown below:

In column 1, line 9, "capaciator" should read --capacitor--.
In column 2, line 4, "rocket" should read --rotor--.

Signed and Sealed this

Sixteenth Day of April 1985

[SEAL]

Attest:

DONALD J. QUIGG

Attesting Officer  Acting Commissioner of Patents and Trademarks